United States Patent
Hatfield et al.

(10) Patent No.: US 9,378,176 B2
(45) Date of Patent: Jun. 28, 2016

(54) DATA INTERFACE WITH VARIABLE BIT CLOCK FOR CHANGING THE NUMBER OF TIME SLOTS IN A FRAME

(75) Inventors: Robert James Hatfield, Edinburgh (GB); Gordon Richard McLeod, Linlithgow Bridge (GB); John Laurence Pennock, Juniper Green (GB)

(73) Assignee: Cirrus Logic International Semiconductor Ltd., Edinburgh (GB)

( * ) Notice: Subject to any disclaimer, the term of this patent is extended or adjusted under 35 U.S.C. 154(b) by 700 days.

(21) Appl. No.: 13/515,885

(22) PCT Filed: Dec. 17, 2010

(86) PCT No.: PCT/GB2010/052137
§ 371 (c)(1),
(2), (4) Date: Jul. 5, 2012

(87) PCT Pub. No.: WO2011/073681
PCT Pub. Date: Jun. 23, 2011

(65) Prior Publication Data
US 2012/0272089 A1  Oct. 25, 2012

Related U.S. Application Data
(60) Provisional application No. 61/287,520, filed on Dec. 17, 2009.

(30) Foreign Application Priority Data

Dec. 17, 2009 (GB) .................................. 0922071.6

(51) Int. Cl.
*G06F 1/04* (2006.01)
*G06F 1/00* (2006.01)
*H04L 12/43* (2006.01)
(Continued)

(52) U.S. Cl.
CPC .............. *G06F 13/4291* (2013.01); *G06F 1/12* (2013.01); *G06F 13/4282* (2013.01); *H04J 3/00* (2013.01); *H04J 3/16* (2013.01); *G06F 1/04* (2013.01); *G06F 13/00* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| 4,967,410 A * | 10/1990 | Takase et al. ................. 370/510 |
| 6,654,838 B1 * | 11/2003 | Leonard ........................ 710/240 |
| 6,839,830 B2 * | 1/2005 | Liu ................................ 712/200 |
| 2002/0150218 A1* | 10/2002 | Drzewiecki et al. ......... 379/67.1 |
| 2006/0039410 A1* | 2/2006 | Ngo ................................ 370/489 |
| 2007/0116063 A1* | 5/2007 | Hardy et al. ................... 370/508 |

FOREIGN PATENT DOCUMENTS

| DE | 101 36 662 A1 | 2/2003 |
| EP | 0 605 267 A1 | 7/1994 |

(Continued)

*Primary Examiner* — Ji H Bae
(74) *Attorney, Agent, or Firm* — Dickstein Shapiro LLP (57) ABSTRACT

The present invention relates to methods and apparatus for data transfer. A data interface is described with at least a first data terminal for either outputting or receiving a data signal. In bi-directional embodiments there may be one terminal for receiving data and one terminal for outputting data. A bit clock terminal outputs or receives a bit clock signal; and a frame clock terminal for outputs or receives a frame clock signal. Interface control circuitry is configurable to associate data outputted or received in each frame with time slots (1-8) of a predetermined number of bits (x, y, z) wherein the control circuitry is adapted such that the frequency of the bit clock signal can be changed at any time so as to vary the number of time slots in a frame.

25 Claims, 7 Drawing Sheets

(51) Int. Cl.
*H04J 3/02* (2006.01)
*G06F 13/42* (2006.01)
*G06F 1/12* (2006.01)
*H04J 3/00* (2006.01)
*H04J 3/16* (2006.01)
*G06F 13/00* (2006.01)

(56) References Cited

FOREIGN PATENT DOCUMENTS

| | | |
|---|---|---|
| GB | 2 453 823 A | 4/2009 |
| WO | WO 97/37451 A1 | 10/1997 |

* cited by examiner

DATA INTERFACE WITH VARIABLE BIT CLOCK FOR CHANGING THE NUMBER OF TIME SLOTS IN A FRAME

This invention relates to a data interface and to methods of data transfer, especially to serial data interfaces for transfer of a data stream such as audio data.

In many modern electronics devices, especially in portable media devices such as mobile telephones, media players or gaming devices and the like, there will typically be a variety of different component integrated circuits (ICs) that need to exchange data. For instance, a host processor may need to send audio data to and/or receive audio data from a dedicated audio codec IC. In some devices, to ease loading on the host processor, there may also be additional processors, such as a dedicated digital signal processing IC (DSP) and thus the host processor may transmit audio data to the DSP for processing and the processed audio data will then be transferred from the DSP to an audio codec IC.

The various ICs therefore require data interfaces for the transfer of data. Different data interfaces are provided to accommodate different classes of data flow. Typically there is a data interface to allow for the transfer of an application data flow such as audio data, e.g. an I$^2$S or PCM interface. Depending on the application this data interface typically allows bi-directional data transfer, and may transfer time-critical data, for example real-time audio streaming data. There is also a control data interface, such as an I$^2$C or SPI interface that allows ICs to exchange control data, for instance a master IC can write to, or read from, a slave IC. This control data can configure the slave device, for example for signal routing or power management of component blocks or operational modes including enabling various interfaces. In some embodiments there may also be a need for programming data to be exchanged between the ICs. For example the host processor may need to send programming code or data to the DSP to enable the DSP to perform particular processing of the audio data. Thus, there may be a need for a separate programming data interface designed to handle high bandwidth data block transfer.

Figure 1:
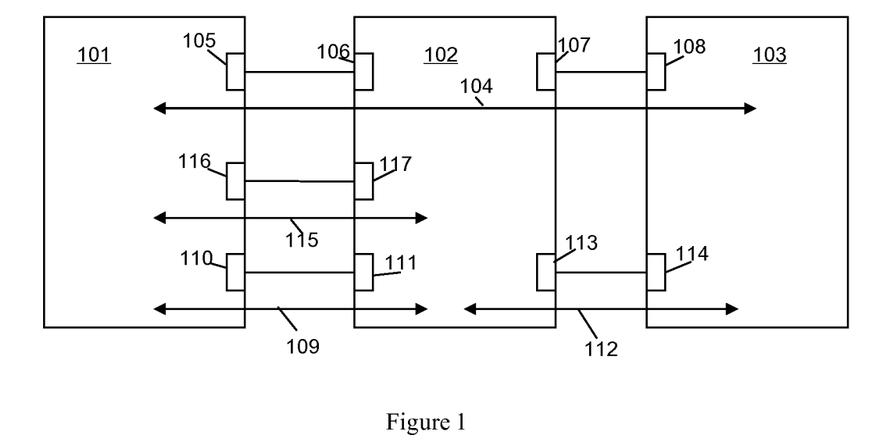
FIG. 1 illustrates an example connection of ICs in a device requiring plural interfaces.

FIG. 1 illustrates an example of data connections in a device 100 that comprises a host processor 101, a DSP 102 and an audio codec IC 103. FIG. 1 also illustrates a first data flow 104, which may for example be an audio data flow, to/from the host processor 101 via the DSP 102 and from/to the codec 103. The host processor 101 therefore has a serial data interface 105, such as an I$^2$S interface, for transmitting data to and receiving data from a corresponding interface 106 on the DSP. The DSP has a further serial data interface 107 for transmitting data to and receiving data from a corresponding interface 108 of the codec IC. This data flow 104 may comprise a plurality of audio channels, i.e. flows or streams of independent audio data, for instance to support stereo or surround sound.

FIG. 1 further illustrates a data flow 109 of control data from the host processor 101 to the DSP 102. The host processor 101 thus also has a serial I$^2$C interface 110 connected, in use, to a corresponding interface 111 on the DSP for sending/receiving control signals to/from the DSP 102. The DSP 102 also acts as a master for the codec 103 (data flow 112) and has an I$^2$C control interface 113 for sending/receiving control signals to/from a corresponding interface 114 of the codec 103.

In this example the DSP 102 is programmable and thus it is desirable that there is a means of transferring programming data from/to the host processor 101 to/from the DSP 102—illustrated by data flow 115. There may therefore be an additional interface 116 on the host processor 101 for transfer of programming data to a corresponding interface 117 of the DSP 102.

It will be appreciated however that each of the aforementioned interfaces requires a respective plurality of connections. An I$^2$C control interface is a two wire interface and thus requires IC terminals for two connections. A bi-directional I$^2$S or PCM data interface requires four or five connections (depending upon the implementation) and thus requires four or five IC terminals. Another serial data interface for programming data would require a similar IC terminal count. Providing multiple interfaces, each having associated terminals for connection to the relevant buses, consumes silicon real estate for circuitry and bond pads and thus increases the physical size, cost and complexity and power consumption of the IC.

It is therefore an aim of the present invention to provide an interface that mitigates at least some of the above mentioned disadvantages.

Thus according to the present invention there is provided a data interface comprising: a first data terminal for outputting or receiving a data signal; a bit clock terminal for outputting or receiving a bit clock signal; a frame clock terminal for outputting or receiving a frame clock signal; and control circuitry configurable to associate data outputted or received in each frame with time slots of a predetermined number of bits; wherein the control circuitry is adapted such that the frequency of the bit clock signal can be changed at any time so as to vary the number of time slots in a frame.

The control circuitry is configurable to associate predetermined time slots with predetermined data channels and to access the relevant channel only if the frame contains the appropriate time slot. The control circuitry is also configurable to control which time slots are associated with each data channel and/or to control the number of bits associated with each time slot.

The TDM interface control circuitry is configurable such that a plurality of classes of data flow may be output or received within a frame time defined by the frame clock signal, each class of data flow being associated with a group of time slots, each group of time slots comprising one or more time slots. Each class of data flow may be handled differently by the data interface.

At least one class of data flow comprises an application data flow of application data, which may be a real time data stream such as audio or video data. At least one class of data flow may be a control data flow of control data, which may be an intermittent low bandwidth data flow, such as control data for controlling the interface or an associated circuit. At least one class of data flow may be a program data flow of program data, which be an intermittent, high data rate data flow such as code for algorithms to be performed by programmable digital signal processing circuitry or coefficients for algorithms. At least one class of data flow comprises a haptic data flow of haptic data.

The data interface may be unidirectional, i.e. it either receives or outputs data but not both. In some embodiments however the data interface is bi-directional and thus the first data terminal is configured for outputting data and there is also a second data terminal configured for receiving data.

There may be separate frame clocks for transmitting and receiving and thus there may be an additional frame clock terminal configured to receive or output a receiving frame clock signal.

The interface may also comprise a bit clock generation circuit for generating the bit clock signal. The bit clock generation circuit may have a terminal for receiving a master clock signal and a programmable clock divider for dividing said clock signal. The bit clock generation circuit may be capable of varying the number of cycles of the bit clock signal per frame by a factor of greater than 9 and/or of varying the frequency of the bit clock signals by a factor of greater than 150.

The control circuitry may comprise a plurality of data buffers, each data buffer being arranged to hold data for one or more data channels; and a buffer selector configured to receive the bit clock signal and the frame clock signal and to select an appropriate data buffer based on the associated time slot.

The control circuitry is also configured such that the frequency of the frame clock signal can be changed at any time.

The interface may be part of an integrated circuit. The integrated circuit may have at least one application data channel wherein the presence or absence of an appropriate time slot having non-zero application data is used to activate or deactivate the appropriate channel. The IC may be joined to another IC via data interfaces according to the present invention in an electronic device. The electronic device may be a battery powered device, a portable device, a personal audio device, a personal video device; a mobile telephone, a personal data assistant, a gaming device, a portable computing device, a laptop and/or a satellite navigation system.

In a second aspect of the invention there is provided a method of data transfer comprising: receiving a bit clock signal; receiving a frame clock signal; transmitting or receiving a data signal wherein said data is transmitted or received in one or more time slots of a predetermined number of bits; wherein the bit clock signal frequency may be varied at any time independently of the frame clock so as to vary the number of time slots in a frame.

In a third aspect of the invention there is provided a data interface having control circuitry responsive to a bit clock signal and a frame clock signal to transfer data wherein the frequency of the bit clock signal is variable independently of the frame clock signal.

The invention also provides a data transfer protocol comprising: accessing a frame format mapping defining a plurality of time slots, wherein each time comprises a defined number of bit and is associated with a specified data channel; and transferring data, at a bit rate defined by a bit clock signal, in said time slots in order from the beginning of a frame period to the end of a frame period; wherein the frequency of the bit clock signal can be changed to alter the number of time slots in a frame.

In a further aspect of the present invention there is provided a data interface comprising a data terminal for outputting or receiving data wherein said interface can output or receive a plurality of different data types in a single frame period.

The invention will now be described by way of example only with reference to the following drawings, of which.

As mentioned in the introduction, FIG. 1 illustrates one possible arrangement for connecting ICs together where there is a requirement for transfer of data required for a particular application, for instance audio data, possibly time-critical data for example real-time audio streaming data, as well as requirements for exchanging control data for IC configuration and control and also programming code or data for changing the programming of an IC. The arrangement shown in FIG. 1 requires, amongst others, three separate respective and corresponding interfaces for both the host processor 101 and DSP 102 with a consequently relatively high pin or IC terminal count for connections between the ICs and consequent chip area and power consumption.

Figure 2:
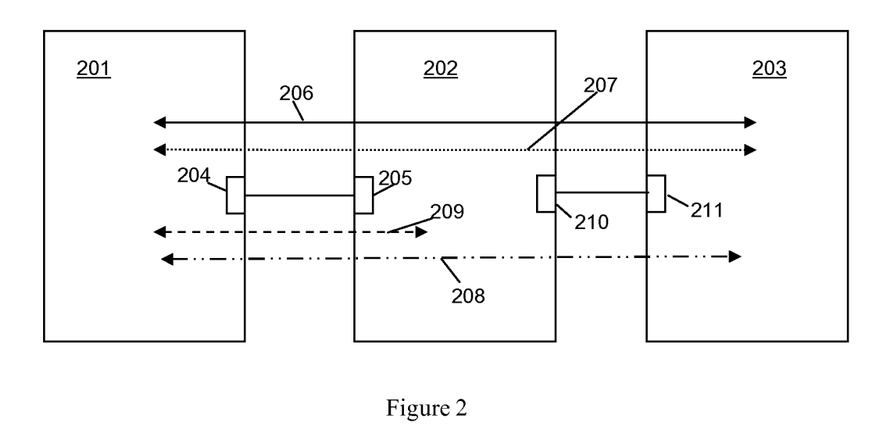
FIG. 2 illustrates an example connection of ICs having interfaces according to an embodiment of the present invention.

FIG. 2 illustrates an alternative arrangement according to an embodiment of the present invention wherein a single interface, referred to herein as a "TDM Interface" is used instead. FIG. 2 illustrates a host processor 201 connected to an integrated circuit (IC) 202 which may, for example, comprise at least a digital signal processing (DSP) core. IC 202 will be referred to herein as a "DSP" although it will be appreciated that the IC may also comprise other digital/analogue circuitry. The DSP 202 is further connected to peripheral IC 203 which may, for example, be a codec, such as an audio or video codec.

As illustrated the host processor 201 has a single TDM Interface 204 connected to a corresponding single TDM Interface 205 on the DSP 202. This TDM Interface allows various distinct data flows between the host processor and the DSP. FIG. 2 shows conceptually four different data flows 206, 207, 208, 209 for data transfer between the host processor 201 and the DSP 202 with each of these data flows being transferred via respective TDM Interfaces 204 and 205. These data flows, 206-209, may involve the transfer of different types of data as will be described below and each flow may comprise a continual, periodic or sporadic transfer of data in one or both directions. Some of the data flows may have characteristics in common and thus belong to a class of data flow.

For example data flows 206 and 207 may be audio data streams, for example one data flow may be incoming high-resolution stereo music data and the other data flow may be incoming and outgoing mono voice data. An audio data stream typically has a fixed data rate and is real time with a high priority (it is not acceptable for noticeable interruptions in the resultant audio). It should be noted that the discussion below will use audio data as an example but it will be appreciated that other types of data may need to be exchanged in addition to or instead of audio, e.g. speech or music, data. For example other data streams may include video data or other data for processing. Video data, like audio data, may be real time and high priority and may also be generally fixed data rate. In general audio data (or video data) can be seen as an example of application data that is transferred as part of running an application. Thus application data flow represents a class of data flow.

The TDM Interface 204 on the host processor and/or the TDM Interface 205 on the DSP may be arranged such that the audio data streams 206 and 207 may be associated with direct memory access (DMA) channels (not illustrated) as will be described in more detail later.

Data flow 208 may represent the exchange of control data between the host processor 201 and the DSP 202. The host processor TDM Interface 204 therefore also allows the exchange of control data with the DSP 202. The control data may be any type of data which is used for controlling configurable aspects of the operation of the relevant IC, e.g. data which is used to configure the TDM Interface itself for data exchange. Such control data is typically transmitted intermittently and generally has a low data rate requirement. Control data flow thus represents another class of data flow.

Data flow 209 may comprise programming code or other data which may be transferred, for example, from the host processor 201 to program the DSP 202 to perform an appropriate function. Programming data is again typically exchanged intermittently but typically requires a high data rate. For example programming data may be required at device start-up or reset to program the DSP 202 appropriately. This programming data should generally be transmitted at a high data rate to ensure that the DSP 202 is available for use as soon as possible. Also, in some applications it may be necessary to alter the processing performed on the data in use. For example, in a mobile telephone application if the device transfers between cells of the mobile network it may be necessary to change the processing algorithms used to match the protocol used by the new cell. This should be done rapidly to avoid any loss in connectivity. There may be, for example, 300 Kb of code to be transmitted in under 10 ms, implying a required data transfer rate of at least 30 Mb/s. Program data flow thus represents another class or type of data flow.

The DSP 202 has a corresponding TDM Interface 205 which directs incoming and outgoing data from each of the data flows 206-209 appropriately and generally differently. For instance data flows 206 and 207 representing audio data may be transferred to/received from a processing signal path within the DSP. Control data received from the host processor may be used to update some control registers. Programming data or code may be stored in a buffer until ready to be used or executed. The TDM Interface 204 on the host processor 201 and the corresponding TDM Interface 205 on the DSP thus allow for transfer of one or more audio (or other) data streams, control data and high data rate programming data between the host processor 201 and DSP 202.

The DSP 202 is also connected to the codec 203, i.e. a peripheral IC, for transmission/receipt of data. In the example shown in FIG. 2 both the audio data flows 206 and 207 include data being transferred to/received from the codec 203 via the DSP 202, possibly being processed in the DSP: although it will be appreciated that in some embodiments the DSP 202 may transmit/receive different data streams to/from different peripheral ICs. The DSP 202 therefore has an interface 210 connected to an interface 211 on the codec. These interfaces, 210, 211 may also both comprise TDM Interfaces according to embodiments of the present invention, although in this instance there may not be any need to transfer any programming data between the DSP 202 and the codec 203. In some embodiments however the codec 203 itself may be programmable in some aspects. For example, the audio codec may comprise other functionality, such as audio processing algorithms (3D sound, Equalisation etc.) or power management, that may benefit from any combination of audio, control or programming data.

In any case the use of TDM Interfaces for data transfer between the DSP 202 and codec 203 may eliminate the need for separate control interfaces. In some embodiments however the interfaces 210, 211 connecting the DSP 202 and the codec 203 may both be conventional serial data interfaces or the interface 210 on the DSP may be a TDM Interface and the interface 211 on the codec 203 may be a standard PCM or I2S interface. As will be described later a TDM Interface according to embodiments of the present invention may be compatible with legacy PCM or I²S interfaces.

Each TDM Interface comprises at least a first data terminal for data transfer, i.e. either for outputting (transmitting) or for receiving a data signal. Typically the interface supports bi-directional data transfer and thus there will be a first data terminal for transmitting data and a second data terminal for receiving data. In some applications however there may be dedicated interfaces for transmitting data and also dedicated interfaces for receiving data and such interfaces may comprise only one appropriate data terminal. The TDM Interface also comprises a bit clock terminal for either outputting or receiving a bit clock signal and a frame clock terminal for either outputting or receiving a frame clock signal. The frame clock signal defines a frame and the bit clock signal defines the bit period. One of the ICs, the master, will generate the bit clock signal and the frame clock signal and send these signals to the other IC, the slave. In some embodiments there may be a single frame clock used for both transmission and receipt of data although in other embodiments there may be separate transmit and receive frame clocks. In some embodiments there may also be separate bit clocks for data transmitted and received by the master device. In some embodiments each IC may generate its own bit clock for transmission of data from itself. In other words a first IC would generate a first bit clock for transmission of data to a second IC and thus the first bit clock would be output from the first IC to the second IC. However the second IC would generate the bit clock for transmission of data from the second IC thus the first IC would receive the second bit clock for receipt of data.

A TDM Interface may thus consists of a plurality of terminals which are used to connect to another interface, typically in a four or five wire connection, in a similar configuration as a typical PCM or I²S interface. It will be appreciated that a terminal of the interface may comprise pins, leads, bond pads for wire-bonding or the attachment of solder balls, or any suitable element that can be used to provide a suitable connection.

The terminals therefore represent inputs or outputs or input or output nodes of the interface.

FIGS. 3*a-d* shows various possible interconnection arrangements. BCLK is the terminal for a bit clock signal used for the transmitted and received data on both ICs. TXDAT is the transmit data output and RXDAT is the received data input, with the TXDAT terminal on each IC connected to the RXDAT terminal of the other. In the four wire connection arrangement illustrated in FIGS. 3*a* and 3*b* with device A or device B being the master respectively, the RXLRCLK terminals are connected together and to transmit a frame clock from master to slave that is used for data in both directions.

Figure 3A:
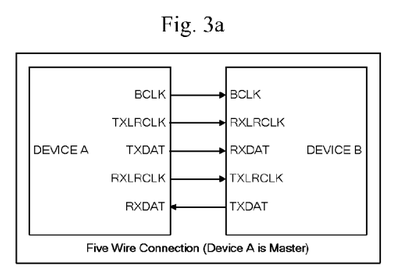
FIGS. 3a to 3d illustrate various possible connections using interfaces according to embodiments of the present invention.
Figure 3B:
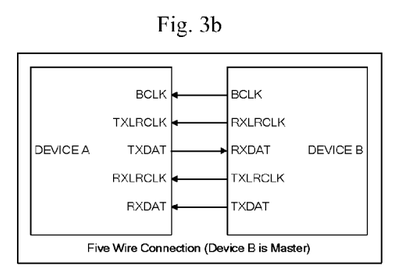
Figure 3C:
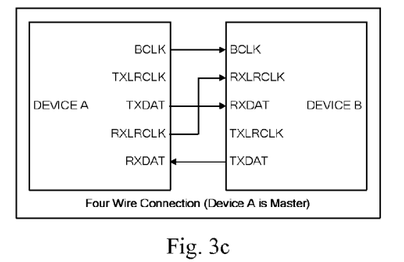
Figure 3D:
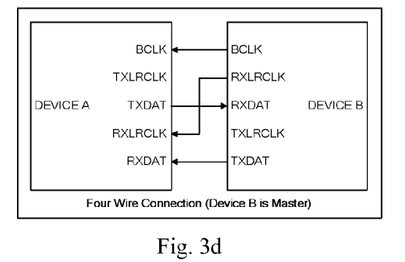

In the five wire connection shown in FIGS. 3*c* and 3*d* (with device A and device B being the master respectively) the RXLRCLK terminal on the master is connected to the TXLRCLK terminal of the slave and used to define the frame clock for data transmitted to the master and a separate terminal, TXLRCLK, on the master is connected to the RXCLK terminal on the slave and defines a frame clock for data transmitted from the master.

If there were independent BCLK clocks for each direction, the BCLK terminals could be replaced by RXBCLK and TXBCLK terminals analogously to the RXLRCLK and TXLRCLK terminals above.

In one embodiment all TDM Interface terminals, e.g. pins, are high impedance in the default power-up state. All TDM Interface outputs may drive low when the TDM Interface is stopped (i.e. enabled but not actively streaming data). Each TDM Interface input or i/o pin may have individually programmable pull-down resistances and each TDM Interface output or i/o pin may be individually programmable so as to control a tristate capability of that output or i/o.

If the TDM Interface includes a TXLRCLK terminal such a pin may have alternative functions, i.e. two or more functions, if required. For example, if not used for a second frame clock the TXLRCLK pin may be configured to function as a general purpose input/output (GPIO) pin.

It will, of course, be appreciated by those skilled in the art that whilst FIG. 3 shows a single wire per connection arrangement, with one data transmit terminal and one data receive terminal, other arrangements are possible. For instance one or more of the connections may comprise a differential connection arrangement, such as a low-voltage differential signalling (LVDS) scheme (including LVDS variants) for example, and thus there may be two terminals for transmitting or receiving a differential equivalent of a single signal. Further, in some embodiments there may be a plurality of transmit and/or receive connections allowing for parallel data transfer. Each such transmit/receive connection may have an associated bit clock or a bit clock may be shared between connections. The discussion herein in relation to a single transmit connection and/or a single receive connection may therefore be extended to multiple such connections. It will also be appreciated that TDM Interfaces may be used to connect ICs together whether those ICs are in separate packages or packaged together in a single package. Indeed in some application different parts of a single chip may communicate via TDM Interfaces—although in this instance the connections between the TDM Interfaces may comprise conducting tracks on the chip.

The TDM Interface also comprises control circuitry configured to associate data outputted or received in each frame with time slots of a predetermined number of bits, i.e. of a predetermined word length, wherein the control circuitry is adapted such that the frequency of the bit clock signal can be changed at any time so as to vary the number of time slots in a frame.

The TDM Interface thus supports dynamic clock bit scaling to allow a change in the data transfer rate. This provides the flexibility to provide more bandwidth where required (e.g. for rapid data transfer) without interrupting existing real time data streams (e.g. audio) or compromising power consumption when high bandwidth is not required.

It will be appreciated that the frequency of operation of a TDM Interface depends on the bit rate set by the bit clock signal. The power consumption of the TDM Interface is linked to the frequency of operation, for instance the rate at which buffers are read, switches operated etc. Thus a higher data rate results in greater power consumption than a lower data, over a set period, even if the same amount of useful data is transferred during that period. The TDM Interface according to an aspect of the present invention thus allows the frequency of operation to be reduced when a low data rate is possible to reduce power consumption but to be increased when necessary.

Using a TDM Interface, the clock bit rate can be changed independently of the frame clock rate and thus the number of bits, and hence the number of time slots, within a frame can be varied. It may be possible to vary the bit rate at any time, even during a frame, i.e. there may be no need to synchronise a change in bit clock rate to a frame boundary. The control circuitry is configured to associate predetermined time slots with predetermined data channels and to access the relevant data channel if the frame contains the appropriate time slot. Only data channels for which there is an appropriate time slot within the frame are accessed and thus absence of a time slot simply means that the relevant data channel is not accessed. At the receiver, any data in incomplete time slots received at the end of a frame is simply ignored. At the transmitter, any data channel data word corresponding to an incomplete timeslot would be transmitted or retransmitted in a subsequent frame.

As used herein the term data channel means a distinct or independent part of a data flow (for example: the separate left and right channels or a stereo audio signal; each channel of multi-channel audio for surround sound; each signal from an array of microphones, perhaps for noise cancellation or telephonic transmission; each one of a set of stored streaming audio channels intended for mixing or other audio enhancements by the receiving DSP; separate channels for control data for configuration of the interface, for configuration of the DSP IC, or for direct onward transmission another IC, for example an audio codec), and the routing and handling associated with such data to ensure that the flow remains consistent and distinct from other flows. Data flows, for example 206, 207, 208 and 209 referred to above in reference to FIG. 2, may comprise one or more data channels. Data channels may each comprise one or more time slots, which may be contiguous. Data in data channels received by an IC may be merged or split or replicated to generate fewer or more data channels to be output, perhaps by digital signal processing in a DSP.

Figure 4A:
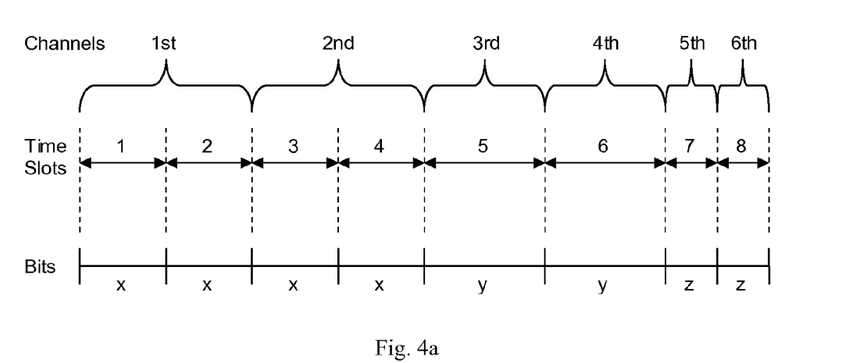
FIGS. 4a and 4b illustrate mapping of time slots to data channels and possible resulting frames.

FIG. 4a illustrates an example frame mapping or frame format of time slots and data channels. The mapping defines four initial time slots, 1-4, each being x bits long. Then there are two further time slots, 5-6, each of y bits long. Finally there are two further time slots, 7-8, each being z bits long. Time slots 1 and 2 may be associated with a first data channel, and time slots 3 and 4 with a second data channel. Time slots 5 and 6 may be associated with data channels 3 and 4 respectively and time slots 7 and 8 with data channels 5 and 6 respectively. These data channels could, for instance, correspond to various audio outputs. For instance data channels 1 and 2 could correspond to left and right outputs for stereo speakers. In this case the data may be high-resolution audio, so requires more than x bits per sample. Data channels 3 and 4 could correspond to audio data inputs from left and right noise cancellation microphones (as found in devices with noise cancelling capabilities such as earbuds, headsets, mobile phones etc.). The data in channels 3 and 4 may be a different resolution to that in respect of channels 1 and 2 and so respectively requires only one time slot of y bits. For simplicity, all time slots for a given class of data may be the same bit length, but as in this case, the interfaces may be designed to be configurable with a different bit length associated with each time slot. Alternatively data channels 3 and 4 could correspond to audio data outputs to left and right noise cancellation speakers (as found in devices with noise cancelling capabilities such as earbuds, headsets etc.). Data channel 5 may be a control channel for exchange of control data and data channel 6 could be a programming data channel. So, in this example, time slots 1 to 6 (data channels 1 to 4) comprise application data, time slot 7 (data channel 5) comprises control data and time slot 8 (data channel 6) comprises programming data.

Figure 4B:
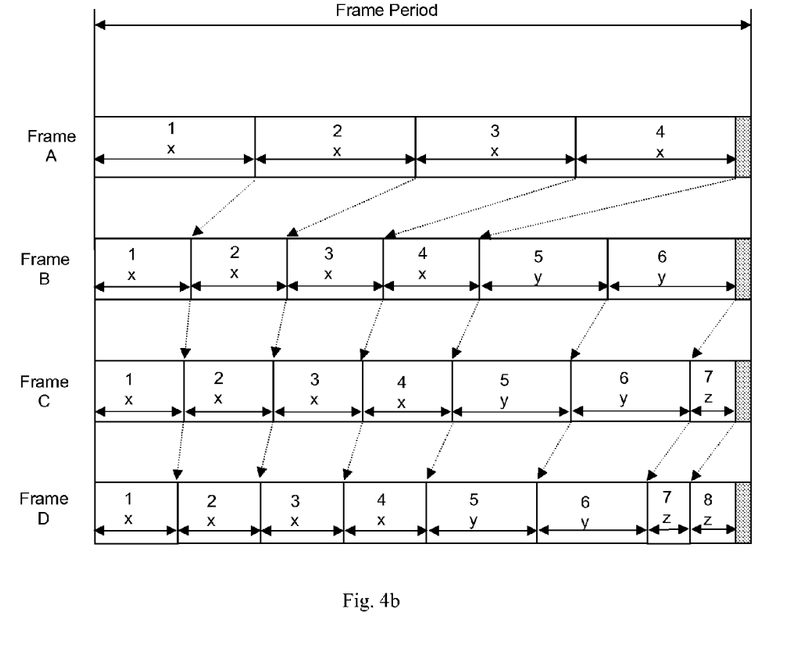

The frame mapping defines the maximum number of time slots associated with each class of data flow. As the bit clock rate is variable independently of the frame clock the number of bits per frame and hence the number of time slots that occur per frame is variable. Examples of possible scenarios are illustrated in FIG. 4b. In frame A the bit clock rate is set so that the total number of bits in a frame is just slightly over 4x. Thus each frame consists of only four complete time slots, i.e. time slots 1-4. Hence frame A only contains data for data channels 1 and 2. This bit clock rate may be used when there is only audio data for the output to be transmitted. The interface control circuitry will load the first 2x bits received in the frame into a buffer for audio data channel 1. The interface control circuitry will then load the next 2x bits into a buffer for audio data channel 2. The interface control circuitry will then start to load the next y bits, as the fifth time slot, into a buffer for channel 3. However the frame clock signal will indicate the end of the frame before the y bits needed for this time slot have been received and so the interface control circuitry will discard any bits in the buffer and start again loading bits from time slot 1 of the new frame into the buffer for data channel 1.

If however noise cancellation is enabled there is a need to include additional data for the noise cancellation speakers. Thus, the bit clock rate may be increased so that a frame comprises at least 4x+2y bits, i.e. frame B. During such a frame the TDM Interface will succeed in loading data from the fifth time slot into a buffer for data channel 3 and data from the sixth time slot into the buffer for data channel 4.

If control data also needs to be transferred the bit clock rate may be increased again so that the frame, e.g. frame C, comprises at least 4x+2y+z bits of data. This frame thus contains enough bits for the first seven time slots to be completed within the frame. If programming data is required the bit clock rate may be varied again to increase the number of time slots within the frame, frame D, to include the programming time slot 8. For clarity, only a single time slot is shown for the programming data, but in general multiple time slots will be assigned to programming data to obtain the required high number of data bits transmitted per frame. The bit length for programming data need not be the same as that for control data.

In this way the base audio data stream for data channels 1 and 2 can be maintained but the bit rate can be increased when needed to allow for additional data channels. Thus, when only a low data rate is required, the bit clock rate can be scaled down to a reduced frequency in order to save power. By associating time slots of predetermined bit length with predetermined data channels the data handling by the interface is straightforward and advantageously avoids complex circuitry and/or software.

It should be noted that the presence of non-zero data in an appropriate time slot in the frame could be used to activate circuitry associated with a particular data channel without any separate need for an activation, i.e. control, signal. For example, if frame A is used with data for data channels 1 and 2 then circuitry associated with data channels 1 and 2 may be active but circuitry associated with at least some other channels may be inactive. In the example discussed above this may mean that processing associated with a stereo audio output (data channels 1 and 2) may be active but circuitry associated with noise cancellation (channels 3 and 4) may be inactive. Increasing the bit clock frequency such that a frame includes time slots for data channels 3 and 4 (with non-zero data in the relevant time slots) may be used to activate the circuitry associated with data channels 3 and 4. The allocation of data channels to predetermined time slots in a frame and the use thereof to activate or deactivate circuitry associated with the data channels represents another aspect of the present invention.

The frequency of the bit clock signal, BCLK, may be changed dynamically while the TDM Interface is active in order to save power when fewer TDM Interface data channels are required and to increase the number of TDM Interface data channels when required. When the TDM Interface is in master mode (i.e. generating the frame clock or clocks and bit clock) it is preferable to change the BCLK frequency in a glitch-free manner as would be understood by one skilled in the art. When the TDM Interface is in slave mode (i.e. when the frame clock(s) and bit clock are generated externally) the glitch-free transition to the new frequency is typically expected to be managed by the external device which generates the bit clock.

It will be appreciated of course that the size of the time slots, the number of time slots per data channel and frame clock rate must be sufficient to ensure that a data rate suitable for the particular data channel is achievable.

Typically a suitable frame clock frequency is chosen and the frame clock frequency is fixed while the TDM Interface is active but in some embodiments the frame clock frequency may be configurable. The frame clock rate can be changed independently of the bit clock rate and again at any time, subject to normal design constraints concerning the collision of clock or data edges for example.

The TDM Interface may advantageously support different data sample rates (i.e. frame clock rates). For example, typical audio data sample rates comprise rates such as: 8 kHz; 11.025 kHz; 12 kHz; 16 kHz; 22.05 kHz; 24 kHz; 32 kHz; 44.1 kHz; 48 kHz; 88.2 kHz; 96 kHz; 176.4 kHz; and 192 kHz. Other programmable values of sample rates may also be supported.

The default frame rate may be chosen to allow audio signals sampled at 48 kHz. A stereo pair of 16-bit audio signals would require a bit rate of 2×16×48=1.6 Mb/s, whereas to download say 200 kb or program data in 10 ms would require a bit rate of at least 20 Mb/s, so the bit clock would need to be increased by at least a factor of 10. If only one channel of 12-bit mono telephony speech data sampled at 8 ks/s and if the frame clock were also reduced to 8 ks/s, then a bit clock of some 12×8 ks/s or 96 ks/s would suffice, a factor of more than 200 below that required for the programming data.

Figure 5:
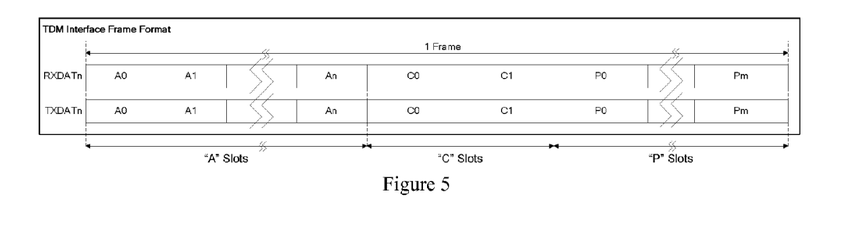
FIG. 5 shows one frame format.

FIG. 5 illustrates a frame format suitable for audio interfaces such as between a host processor and a DSP. The frame format comprises: a programmable number of "A" slots (A0 to An) of programmable word length primarily intended to be used for audio or other real time data streams, operating in a similar way as a standard PCM interface; a pair of selectable contiguous 32-bit "C" slots, primarily intended for control data such as intermittent commands (although any number of control time slots could be specified); and a programmable number of "P" slots, primarily intended for program data or other large data blocks of predetermined size.

Programmable word lengths of n-bits, such as, for example, 16, 20, 24 or 32-bits, may be supported on "A" slots. In some embodiments, all "A" slots may have the same word length as each other although variable slot lengths of the A slots may be implemented if required. Changing the word lengths while the TDM Interface is active is not usually required but could be implemented if desired. Specific A slots may be associated with specific DMA channels.

A programmable maximum number of "A" slots per frame is supported, i.e. the number of A slots in the frame mapping. Changing the number of "A" slots in the frame format while the TDM Interface is active may be possible, for instance by exchange of appropriate control data, but such configurability is not necessarily required.

When streaming multi-channel data such as multiple synchronous data channels of audio data occupying respective A slots for example, it is preferable that no data sample delay errors should be introduced between different "A" slots on the TDM Interface (i.e. all "A" slots should preferably maintain the same phase relationship as in the source data relative to the frame clock).

The C slots have a configurable word length, for example 32 bits long, and in one embodiment the number of C slots is configurable between 2 slots or zero slots. The C slots may typically be used for configuration of the interface or the IC but, in some embodiments the C data could be used for other non-time-critical data. For example the C data slots be used to send data representing the track title of an audio file or alternatively other text to display somewhere. If the IC includes a touch-panel ADC, the C data could represent touch panel data. In other applications, the C data might comprise data from a temperature sensor, a light-level detector, an orientation sensor, a radiation sensor, or other types of non-time critical data, which data may be for example sampled sporadically or at a sample rate much lower than the audio sample rate or interface frame rate. It will be appreciated by those skilled in the art the C data could represent many different types of data for many different applications.

The programming P slots are typically used for program data. There may have a fixed slot length such as 32 bits and the number of slots may be configurable. To allow for high data rates the number of program data slots per frame may be relatively large, for instance in one embodiment the TDM Interface is configurable to include more than one hundred P slots per frame if required.

The TDM Interface can thus support a configurable frame format comprising contiguous groups of time slots, such as A, C and P slots describe above. It is not usually necessary to change this configuration while the TDM Interface is active, i.e. the TDM Interface configuration in terms of: (a) the respective number of A, C and P slots of the frame format; and (b) the A slot word lengths may be fixed while the TDM Interface is actively streaming data but may be able to be reconfigured at any time otherwise.

It will of course be appreciated that not only is the number and type of slots in a frame configurable but the order of the slots may be configurable. Also all slots of the same type need not be contiguous, thus there could be some A slots, some C slots and then some more A slots for example.

The exact configuration of the frame format or template may be configured before the transfer of the data starts. The number and size of the A slots and the data channels associated with each A slot may be configured. The number of C slots may be configured (as may the size of the C slots although in some embodiments the size of the C slots may be predefined and fixed). The number of P slots may also configurable. Again the size of the P slots may be configurable or may be fixed. The configuration of the frame and the association between the data channels and the time slots may be specified in control registers. Such control registers may be part of the interface circuitry or may be located elsewhere on the relevant IC, such as in a local or central register bank with routing to the interface control circuitry.

Figures 6, 6D:
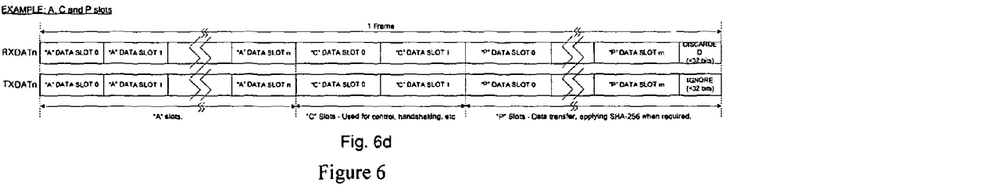
FIGS. 6a to 6d shows other possible frame formats that may be enabled.
Figure 6A:
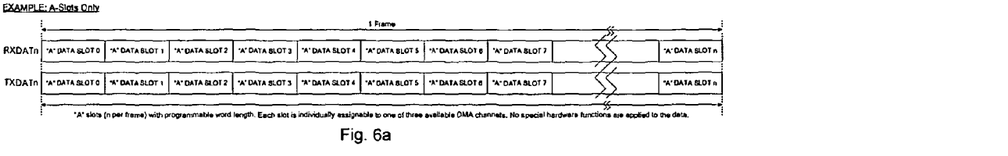

FIG. 6 shows some examples of the type of frame formats that may be configured. FIG. 6a shows a frame consisting of A slots only. This configuration is compatible with legacy PCM and I²S modes and thus a TDM Interface according to an embodiment could interface with an IC having a PCM or I²S interface using such a frame configuration.

Figure 6B:
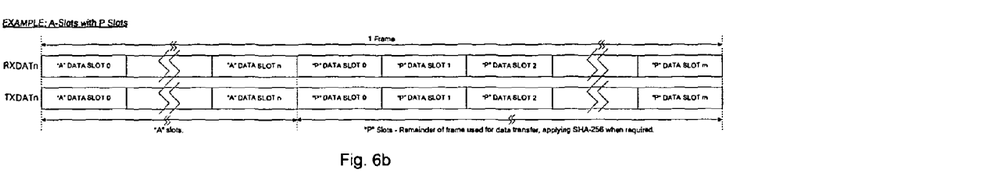

FIG. 6b shows an embodiment with A and P slots only, i.e. no C slots. Thus, in one embodiment it is possible to disable the "C" slots while using "A" and "P" slots. When transmitting only A data, the interface may be configured with the appropriate bit lengths and time slot structure to render it compatible with legacy PCM and I²S modes, and thus capable of interfacing with ICs that can only support these modes.

Figure 6C:
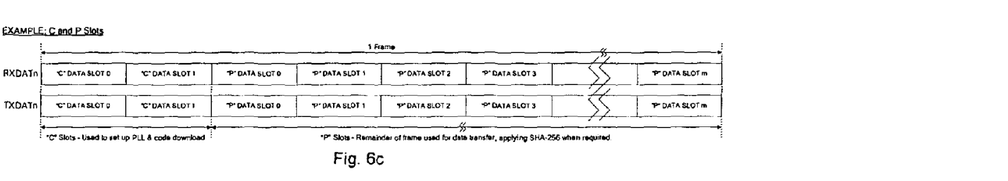

FIG. 6c shows an example consisting of C and P data slots only, i.e. with no A slots. This configuration may be used as part of a boot sequence for instance for setting up the DSP and the connection with the host processor. This may therefore be the default frame configuration for the TDM Interface which may then be reconfigured following the boot sequence into a desired configuration.

FIG. 6d shows a frame format which is the same as that shown in FIG. 5 comprising A, C and P slots. This configuration would typically be used when the TDM Interface is connected to another TDM Interface.

In another configuration, not shown, it is possible to disable the "A" and "C" slots while using "P" slots, thus the first time slot in a frame would be treated as a P slot. In yet another configuration, not shown, it is possible to configure the "C" slots before A or P slots: the TDM Interface can then "idle" in a state where only one time slot or channel of control data is transmitted, with possibly a reduced frequency frame clock, to provide a very low power standby state, able to be quickly brought into an active higher-bandwidth state via an appropriate command word sent on this C data channel.

It will be appreciated that default settings for configuring the TDM Interface, e.g. those applied on power-up or after application of a reset, may be hardwired into the relevant interface or IC or may be stored in a non-volatile memory, which may be on-chip or off-chip and may be automatically loaded from such memory on power-up or reset. The same NVM could be used to store interface settings for more than one TDM Interface.

Figure 7:
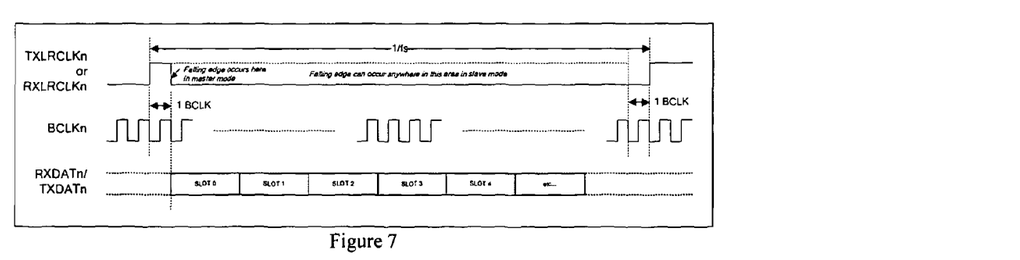
FIG. 7 shows a timing mode compatible with PCM interfaces.
Figure 8:
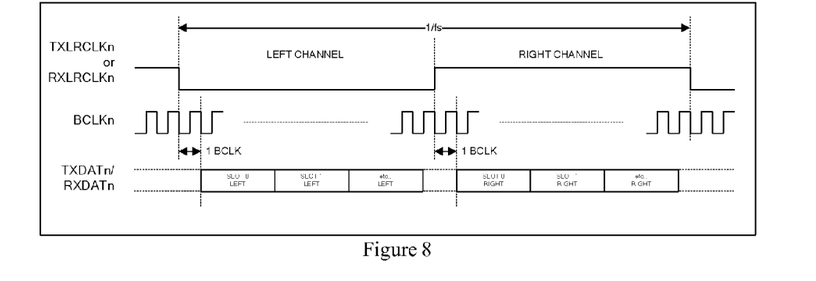
FIG. 8 shows a timing mode compatible with I²S interfaces.

As mentioned above the TDM Interface may be compatible with existing PCM and I²S modes and thus PCM and I²S clock formats may be both supported by the TDM Interface as shown in FIG. 7 and FIG. 8 respectively. The BCLK, TXL-RCLK and RXLRCLK polarities may be individually programmable. In most cases PCM mode clock format will be used although I²S mode may also be available when only "A" slots are used (only required in slave mode, when C and P slots are disabled and when the number of A slots per frame is an even number). Changing frame clock formats while the TDM Interface is active is not usually required but the TDM Interface could be designed to achieve this if desired, as would be appreciated and understood by a person skilled in the art.

The configuration of the TDM Interface may be controlled by control registers, which, as mentioned above may form part of the control circuitry or may be part of some other register bank of the relevant IC. Where there are multiple TDM Interfaces on a single IC the respective control registers for all TDM Interfaces on the IC may be independently programmable.

Figure 9:
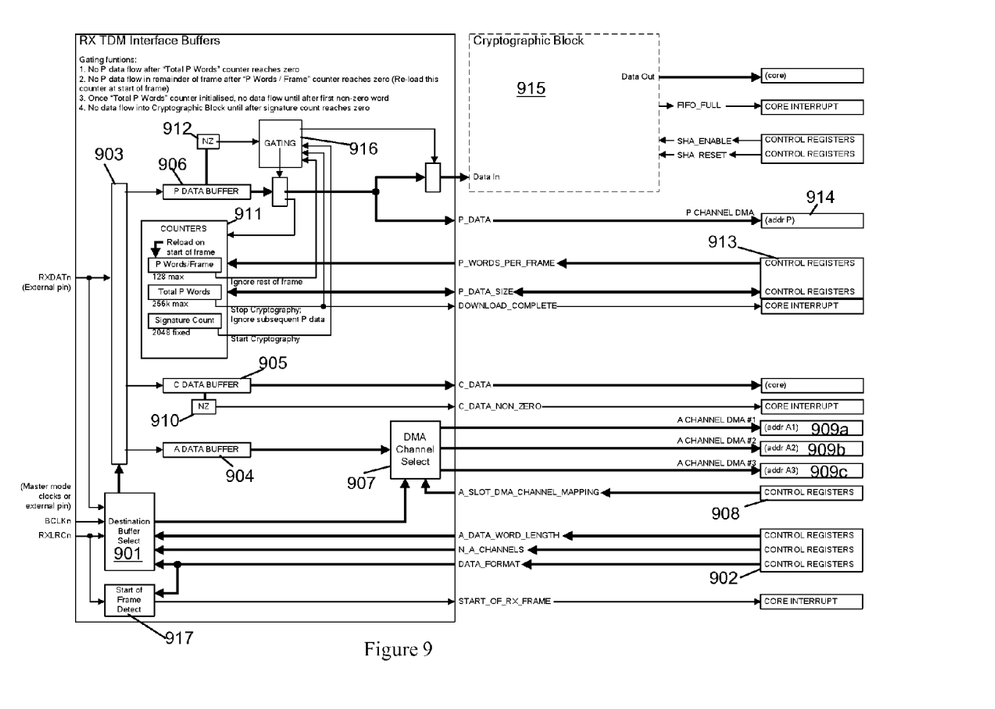
FIG. 9 shows an embodiment of the receive buffers of an interface.
Figure 10:
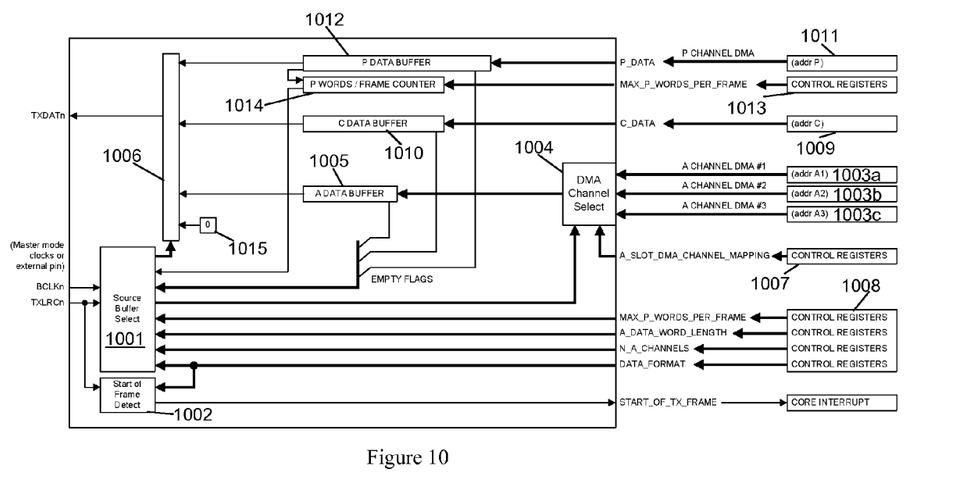
FIG. 10 shows an embodiment of the transmit buffers of an interface.

The basic architecture of an embodiment of a TDM Interface is illustrated with references to FIG. 9 which shows the control circuitry associated with the data receive (Rx) input and FIG. 10 which shows the control circuitry associated with the data transmit (Tx) output.

Referring to FIG. 9 the bit clock signal BCLK and frame clock signal RXLRC are received at destination buffer select unit 901. This unit counts the number of bits from the start of the frame, as determined by frame start detector 917, and, based on the frame configuration stored in control registers 902, controls demultiplexer 903 to direct the data received on the RXDAT input to one of the A data buffer 904, the C data buffer 905 or the P data buffer 906. The control registers specify the A data word length, i.e. the length of A data time slots (which, for the purposes of clarity and brevity of explanation, are all the same length but do not necessarily need to be), the number of A data channels and the data format. The frame start detector may also generate maskable core interrupts which may be asserted at the beginning of each Rx frame.

From the start of the frame until the bit count reaches the number of A data words multiplied by the A data word length the demultiplexer directs incoming data to the A data buffer 904. The data from this buffer is passed to a channel selector 907, which in this embodiment is a DMA Channel selector. The DMA channel selector is controlled by the bit count from the destination buffer select unit 901 and a channel mapping stored in registers 908 to pass the data from the relevant time slots to the relevant DMA channel 909*a-c*. The Rx buffer thus de-serialises the A data channels which are delimited by the (programmable) word length, transfers them to their assigned memory buffers via DMA and stops when the (programmable) maximum number of A data channels per frame have been transferred.

When the BCLK frequency is high enough for complete C data words to be present in the frame the destination buffer select unit controls demultiplexer 903 to transfer the data corresponding to the control data slots to the de-serialising buffer 905. As the C slots may be included in the frame when P slots are present, even if there is no C data to be transferred, the non-zero detector may detect the presence of non-zero data in buffer 905 and, on detection of non-zero data, generate an interrupt signal. On generation of such an interrupt the core, i.e. DSP, may read the control data in the buffer 905. This allows zero data to be ignored, minimising core operations. Of course C slots may be disabled if not required by specifying the data format in registers 902.

When BCLK frequency is high enough for complete P data words to be present in the frame these may be transferred to a de-serialising buffer 906. P data transfer is enabled with the initialisation of the P word counter 911 and is triggered by the first non-zero word (which is ignored) which detected by non-zero detector 912. The buffering and direct memory access (DMA) transfer of "P" data may therefore be triggered using the first non-zero header word at the start of the "P" data block. The non-zero header may be used purely as a start word and should preferably not be transferred as data. The non-zero header may occur in any complete 32-bit "P" slot within the frame. Once the non-zero start word indicates that data transfer of P data is to begin, all subsequent P data may be contiguous with the exception of truncated slots at the end of the frame and slots which occur after the programmable maximum number of "P" slots per frame has been exceeded as will be described below.

In order to ensure correct data transfer of programming data control registers 913 may specify the total number of P words needed for the whole program and also the maximum number of P words per frame. The number of P words per frame is limited to a maximum by a "P words per frame" counter to avoid reading of invalid data when the BCLK frequency is higher than needed. This counter is reloaded on each frame boundary. All P data words are moved to a memory buffer 914 using DMA until the P word counter indicates that the data transfer is complete. Individually maskable DSP, i.e. core, and (where appropriate to the host device) external interrupts may preferably be available and may be asserted when the "P" data counter indicates that "P" data block DMA transfer is complete.

To assist authentication, the program data may comprise a signature such as a cryptographic hash. The program data received may also be passed through a cryptographic block 915, e.g. a hash function such a SHA-256 for example, and the result compared with the received signature for verification. The P data transfer may therefore also be gated 916 by a counter which ensures that n-bit (where n=2048 for example) signature headers are not passed through the cryptographic hash function block.

When cryptographic capability is included in the TDM Interface the cryptographic operation on the received "P" data slots may be enabled or disabled as required through control of an appropriate setting. When cryptographic capability is enabled a maskable core interrupt may be available which can be asserted in the event of a cryptographic result being ready for reading.

In the event that the bit clock frequency is such so that an incomplete data word is received at the end of a frame, the data for incomplete word is discarded. In other words any incomplete "A", "C" words or "P" words which are truncated at the end of the frame are ignored.

It will therefore be clear that the data received at the receive terminal is handled differently according to the type or class of data flow that it belongs to with the interface handing A, C and P data differently.

FIG. 10 shows an embodiment of the transmit (Tx) data buffers. The bit clock signal BCLK and frame clock signal RXLRC are received by a source buffer selector 1001 and a frame start detector 1002. The frame start detector may also generate maskable core interrupts which may be asserted at the beginning of each Tx frame. The source buffer selector counts the bits from the start of the frame and serialises data from the A channels 1003*a-c* via channel selector 1004, in this embodiment a DMA channel selector, and A data buffer 1005 onto to TXDAT output by controlling multiplexer 1006. The DMA channel selector 1004 receives the bit count signal from the source buffer selector 1001 and also a channel mapping from control registers 1007 to select the correct channel for each A time slot.

The data word length of the A data words, the number of A channels and the data format are all specified in control registers 1008. Only the (programmable) number of available A slots are serialised.

If the frame has not yet ended any data in the C data buffer 1010 from the C data channel 1009 is then serialised and output immediately after the A channels, unless the frame is configured such that there are no C data words in a frame.

If the frame has not yet ended, and there are P data words in the frame format the P data channels 1011 loaded into buffer 1012 are then serialised and output immediately following the C channels, up to the (programmable) maximum number of P words per frame. The maximum number of words per frame is specified in control registers 1013 and counter by counter 1014.

In the event that any source buffer to be serialised has not been reloaded with data by the appropriate time slot an empty flag is set and the TDM Interface will output an all-zero word in the corresponding slot by selecting a zero input 1015.

In the event that the frame ends whilst in the middle of writing a data word, such as an A data word, the interface will maintain the data word, e.g. in the relevant buffer, to be sent in the next appropriate time slot.

It will be noted that the embodiments shown in FIG. 10 illustrate the buffer selectors 901 or 1001 receiving the bit clock signal and the frame clock signal. The TDM Interface may support master mode and slave mode, i.e. generation of bit clock and frame clock locally or remotely. In slave mode the bit clock and the frame clock are generated remotely by the master IC and transmitted to the slave IC. However each TDM Interface may comprise the ability to generate the bit clock signal and the frame clock signal, i.e. each TDM Interface may operate as a master or a slave as required.

Figure 11:
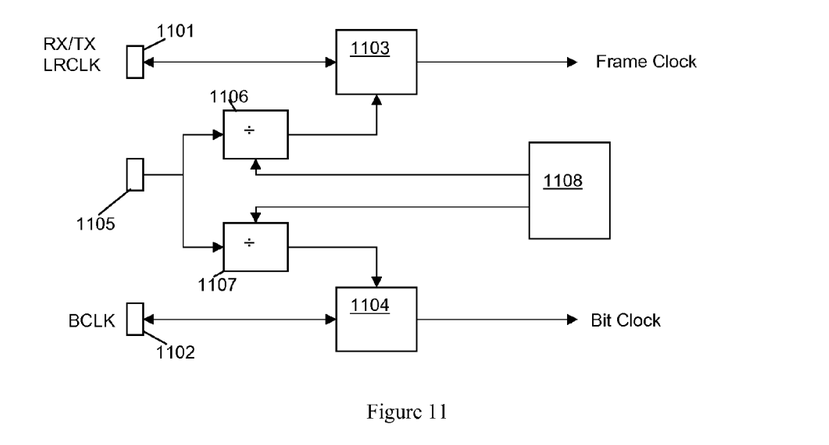
FIG. 11 illustrates a clock generation circuit.

FIG. 11 shows one embodiment of a clock generation circuit which may form part of the TDM Interface. Terminal 1101 is the frame clock terminal of the TDM Interface, e.g. RXLRCLK or TXLRCLK, for receiving or transmitting a frame clock and terminal 1102 is the bit clock terminal of the TDM Interface, e.g. BCLK, for receiving or transmitting a bit clock. In slave mode switch blocks 1103 and 1104 are controlled to pass the clock signals received at these terminals to the TDM Interface control circuitry.

The circuit is also capable of generating the bit and frame clocks from a master clock signal received at node 1105. Node 1105 may be an internal node for receiving an internally generated master clock signal or it may be a node for connecting to a system master clock. The master clock signal received at node 1105 is passed to dividers 1106 and 1107 which separately derive the frame clock and bit clock signals respectively. The dividers are controlled by a clock controller 1108 which determines what bit rate clock is required and adjusts the bit rate according. In master mode the switch blocks 1103 and 1104 receive the respective frame clock and bit clock signals and passes them to the respective internal nodes for use by the interface control circuitry and also to the external terminals 1101 and 1102 respectively for transmission to the slave device.

In master mode, the bit clock divider 1107 may be fully programmable in order to support optimised dynamic bit clock scaling. Divider 1107 may also be operable, maybe under control of a suitable clock controller 1108, to generate or modulate the bit clock frequency from frame to frame (maybe while maintaining the required number of time slots for each frame, or at least the number of "A" slots required for time-sensitive data) so as to provide dithering or spread-spectrum modulation of the bit clock frequency and associated data edges, to reduce EMI. Clock controller 1108 may contain circuitry for noise-shaping the applied dither spectrum to avoid interference in the audio band.

The bit clock and frame clock dividers 1106 and 1107 are preferably independent of any other dividers used for dynamic clock scaling in the device which integrates to the TDM Interface, in particular a change in core or bus clock speeds should preferably not affect bit clock frequency of the TDM Interface. It should be noted the bit clock need not be synchronous with any internal device bus clock(s) such as used for DMA.

The interface should preferably support operation in master or slave mode with a bit clock frequency of up to 100 MHz using any supported configuration of A, C and P slots.

FIG. 11 illustrates generation of a single frame clock signal. As mentioned above in some embodiments there may be separate frame clocks for transmission to or from the master device. A third independent clock divider (not shown) could be used to derive the additional frame clock signal from the master clock signal. The TDM Interface should thus support operation with either a single frame clock for input and output data or independent frame clocks for input and output data. In some embodiments the independent input and output frame clocks are synchronous and maintain an integer frequency relationship.

The TDM Interface may also support programmable bit clock inversion and frame clock inversion in master and slave modes.

Figure 12:
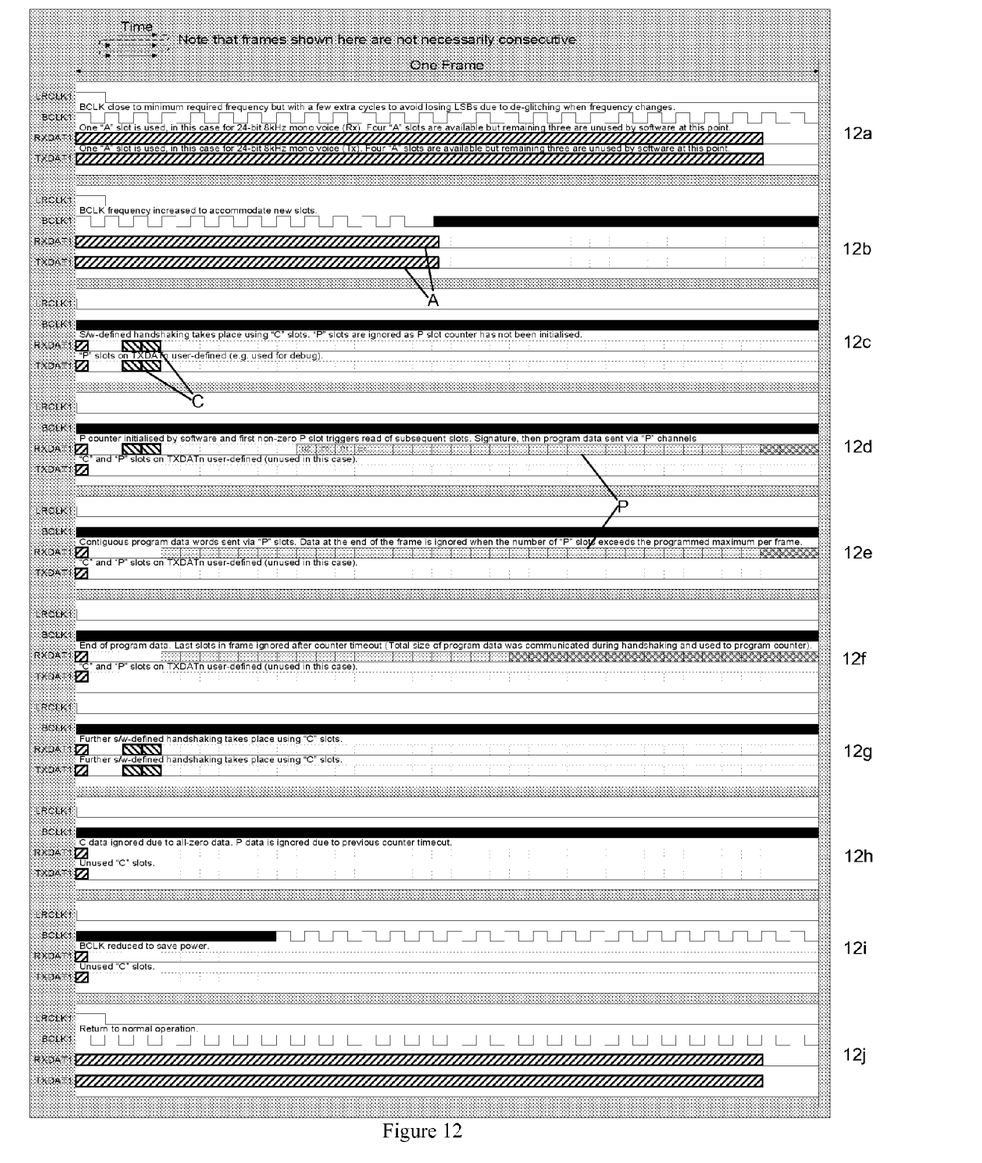
FIG. 12 illustrates a sequence of frames for transferring data according to an embodiment of the invention.

FIG. 12 illustrates a series of frames and how the TDM Interface according to the embodiment of the present invention may be used to provide a variable speed interface to allow for transfer of programming data without interrupting an audio data signal. The example shown in FIG. 12 may be applicable to transfer of data between a host processor 201 and a DSP 202 as shown in FIG. 2. In the example of FIG. 12 the TDM Interface is a bidirectional TDM Interface having a single, constant, frame clock, i.e. a four wire variant such as shown in FIG. 3a or FIG. 3b.

FIG. 12 shows the frame clock signal LRCLK, the bit clock signal BCLK, the data received at the DSP RXDAT, and the data transmitted from the DSP to the host processor TXDAT.

The format of the frame has been previously configured to comprise four A slots, each of 24 bits in length, followed by two control slots followed by at least 34 P slots. The first A slot is associated with one audio data channel. The remaining three A slots may be associated with one or more other audio data channels.

By way of a non-limiting example, initially the TDM Interface is being used to transfer bi-directional voice data, for instance the host device may be a mobile telephone and the TDM Interface is transferring incoming and outgoing voice data between the DSP and the host processor. A single A slot is sufficient for the mono voice data (provided that the frame clock is at least 8 kHz) and thus only one audio data channel is needed in each direction. As only as single A slot is being used in each of the transmit and receive data frames the bit clock frequency is reduced to save power such that the frame contains only slightly more than the 24 bits of the first A slot. FIG. 12a shows a typical frame in this mode of operation.

At some point there is a need to change the processing performed by the DSP. In this example the host processor may be the master device which determines that new programming data is required by the DSP. The host processor may therefore increase the bit frequency significantly in order to provide for more data slots. In this embodiment the bit clock is changed as soon as the need arises and it may be changed in the middle of a frame as illustrated in FIG. 12b. The first part of the frame is at the original bit clock speed and thus part of the first A slot is received at the original bit clock speed. Once the bit clock speed increases the remainder of the first A slot is received at the new bit speed. Thus the A data slot is received without any interruption despite the increase in bit clock speed. As the frame clock rate is not changed the frame illustrated in FIG. 12b thus also contains at least some of the remaining A slots, the C slots and the P slots. However the other A slots are unused and so are filled with zero data. No C data is actually transferred in this frame and the P data is not yet ready to be transmitted so the rest of the frame is blank. The DSP interface simply ignores the empty slots.

In the frame illustrated in FIG. 12c the first A slot contains the voice data as usual. The following other three A slots are still empty. However in this frame the two control slots are used to perform handshaking regarding the upcoming data transfer. FIG. 12c illustrates that control slots are used on both the transmit and receive data lines although in some instances control data may be present on one data line only.

In the frame shown in FIG. 12d there is again the usual single A slots with voice data followed by three empty A slots. In this frame there is further control data on the receive data line. The DSP has now been configured to expect programming data of N words in total with a maximum of 31 program words per frame.

Some time later the first non-zero programming data word is detected on the receive data line. This is used to trigger the data transfer. The next programming data words, P0, P1 . . . etc. are thus transferred to the programming data channel.

After 31 programming slots have been received after the control slots the remaining programming words, the last three in this example, are ignored, irrespective of the fact that the first few programming slots in this frame were empty.

FIG. 12e illustrates a full frame of programming data transfer. In this frame there is one frame of voice data in the first A slot, three empty A slots followed by two blank control slots. The next 31 programming data slots of the receive data line are passed to the programming channel and any remaining programming slots ignored. There may be several frames of operation such as shown in FIG. 12e depending on the amount of programming data to be transferred.

FIG. 12f illustrates a frame where the count of programming words received reaches the indicated number of programming data words to be received. The last slots in the frame are then ignored.

In the frame shown in FIG. 12g there is more software defined handshaking. Thus the first A data slot is used as previously, as are the two control data slots but the rest of the A and C slots of the frame are empty and the P slots are ignored due to the program word count having been reached. FIG. 12h illustrates a frame of operation, still as the high bit clock rate, where only the first A slot is used.

In the frame shown in FIG. 12i the high rate bit clock is maintained for the first part of the frame and thus the audio data is transferred quickly. During the frame however the bit clock is reduced, in a glitch free manner, to save power. The last programming data slot is thus truncated but it is not being used anyway.

Finally in the frame shown in FIG. 12j the bit clock is stable for the whole of the frame at a rate just sufficient for the single A data slot used for the voice data. The TDM Interface is thus back to normal operation and will remain at this low speed until additional time slots are needed again.

It can be seen from the discussion above the TDM Interface according to embodiments of the present invention, and the associated protocol, allows audio data streams (or other data streams) to be maintained uninterrupted whilst "speeding", i.e. increasing the frequency of, the bit clock to allow for high speed data transfer when required. The programming data is transferred rapidly without any interruption to the audio data via the same TDM Interface. The bit clock can be altered at any time during a frame, independently of the bit clock, without causing any difficulties and the interface simply operates straight away at the new bit speed.

An application of where the TDM Interface according to embodiments of the present invention may be useful is where the (relatively low-frequency) LRCLK is kept stable to help keep a stable sampling clock, but where the (relatively higher frequency) BCLK is deliberately spread-spectrum modulated, i.e. is deliberately dithered, so as to reduce EMI as discussed above in relation to clock controller 1108 and divider 1107 of FIG. 11. A TDM Interface according to the present invention would inherently be able to cope with such "dithering", e.g. spread-spectrum modulation at both the transmitter and receiver. It will be appreciated by those skilled in the art that a little care would need to be taken at the end of the frame when applying such spread-spectrum modulation so as to avoid the "wrong" edge of BCLK colliding with the LRCLK, or at least to cope with such a "wrong" edge. One way of dealing with the "wrong" edge would be to ensure an exact (but changing) integer number of BCLK per LCLK. An alternative way of dealing with the "wrong" edge would be by just blanking any marginal BCLK edges at the transmitting end.

It should be noted that if the DSP were the master device controlling the bit clock then it may not be aware that new programming data was required. Typically therefore a device which determines when new programming data is required should be arranged as the master. However if the DSP were arranged as the master it could periodically increase the bit clock frequency to allow for control data to be transmitted from the host processor indicating that a transfer of programming data is required.

Whether or not the DSP is the master or the slave it may be advantageous to provide notification to the DSP before transmitting lots of data thereto. Thus a control bit could be used to warn the DSP that a lot of data can be expected by setting a processor control register or by decoding the control data to generate an interrupt for the processor. This could be used by the DSP to prepare for the arrival of the data for example by cleanly terminating running processes or flushing out data in process or preparing an interface to internal or external memory for high-bandwidth data transfer, in advance of the actual data arriving.

Embodiments of the present invention therefore provide an interface which is compatible with $I^2S$ and PCM interfaces which can serve a range of simultaneous functions, or a set of heterogeneous data flows, such as, for example:
1. Real time audio streaming;
2. Inter-device protocols; and
3. High bandwidth data block transfer (e.g. program code).

Whilst individually some these functions may be performed by other interfaces on an integrated circuit such as an audio DSP, e.g. $I^2C$ or SPI interfaces, a TDM Interface according to embodiments of the present invention provides additional hardware and/or software capability to manage such a multi-function bus.

The TDM Interface may therefore include
1. Authentication hardware to facilitate downloading of signed code;
2. Dynamically scalable bit clocks to provide scalable bandwidth versus power consumption; and
3. Multiple Direct Memory Access (DMA) channels with flexible slot assignments to support multiple unrelated data streams.

The TDM Interface slot format is flexible enough to support packet-based protocols and standard legacy audio streaming modes such as PCM or $I^2S$ to provide backwards compatibility with existing hardware and/or software used in existing systems.

The TDM Interface is also designed to be symmetrical so that a plurality of TDM Interfaces can be connected together to provide a more comprehensive range of functionality to said plurality of TDM Interfaces and hence their associated integrated circuits, software and/or apparatus.

Device or apparatus specific implementations will vary depending on, for example, the following options:
1. Number of DMA channels available; and
2. Integration of Secure Hash Algorithm "SHA" (SHA-256 for example) hardware The TDM interface is also suitable for transferring haptic data, for example data representing waveforms for application to mechanical transducers to provide tactile feedback on touch-screen displays or control panels. In some embodiments, when haptic feedback is required the required waveform will be communicated from the host processor (taken from a storage memory say) to the IC controlling the transducers. In such embodiments the data representing the waveforms could be transmitted via the TDM Interface of the host processor on assigned data channels/time slots, particularly if the haptic stimulus is synchronised to an audio stream also being transmitted. The time slots used for transfer of the haptic data may comprises a dedicated application data channel for haptic data or the haptic data flow may represent a separate class of data flow and thus require dedicated haptic channels.

Alternatively the set of haptic waveforms could be stored locally in the relevant IC, such as in a memory in a codec chip and only data indicating which waveform is required could be transmitted. The data indicating which waveform is required could be transmitted in an appropriate control channel. A selected one of these stored haptic waveforms, or indeed a predetermined sequence of these stored waveforms, could then be applied to a selected transducer via an amplifier on the codec upon receipt by the codec of the corresponding control word transmitted using a control data time slot. If the waveform is of fixed duration, the control word need only be sent at the desired start time. If the waveform is of undefined duration, for example a repetitive waveform, a further control word may be necessary to terminate the application of the waveform to the transducer. The data representing the actual waveform could be transmitted in advance via the TDM interface, perhaps using programming time slots, to be stored in the memory of the codec chip for example.

Alternatively the set of haptic waveforms could be generated locally by programmable or configurable circuitry in the relevant IC, such as an on-chip digital processor in a codec chip, and only data indicating which waveform generation algorithm or method of synthesis is required and an indication of the start and stop time transmitted. For instance, a software tone generator or a pulse generator, generating a waveform of programmable frequency and amplitude and possibly even a configurable modulation envelope. The data indicating which algorithm is required could be transmitted in an appropriate control channel. A selected one of these stored haptic waveform generation algorithms could then generate a waveform which is applied to the transducer via an amplifier on the codec upon receipt by the codec of the corresponding control word transmitted using a control data time slot. The data or code representing the actual software algorithm could be transmitted in advance via the TDM interface, perhaps using programming time slots, to be stored in the memory of the codec chip for example. The generation of the haptic waveform locally would take some processing load off the host processor, and using the TDM interface would avoid any need for an additional interface for control of the haptic outputs.

The TDM Interface may be arranged as part of an integrated circuit, which may be an integrated circuit with an audio signal path and/or audio processing capability. An integrated circuit comprising an embodiment of a TDM Interface according to an embodiment of the invention may be implemented in a host device, especially a portable and/or battery powered host device such as a mobile telephone, an audio player, a video player, a PDA, a mobile computing platform and/or a games device for example. In such applications the reduced pin count allowed by the use of a TDM Interface may offer size and cost advantages and the ability to cope with differing data rates dynamically to reduce power consumption may give system-level benefits such as increased operating time before battery re-charge is needed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A data interface apparatus comprising:
a first data terminal for outputting or receiving a data signal;
a bit clock terminal for outputting or receiving a bit clock signal;
a frame clock terminal for outputting or receiving a frame clock signal; and control circuitry configured to associate data outputted or received in each frame with time slots of a predetermined number of bits;
wherein the control circuitry is configured to vary the frequency of the bit clock signal at any time when the data interface apparatus is outputting or receiving said data signal so as to vary the number of time slots in a frame; and
wherein the control circuitry is configured to associate predetermined time slots with predetermined data channels and to access a data channel only if the frame contains an associated time slot.

2. A data interface apparatus as claimed in claim 1 wherein the control circuitry is configured to control which time slots are associated with each data channel.

3. A data interface apparatus as claimed in claim 1 wherein the control circuitry is configured to control the number of bits associated with each time slot.

4. A data interface apparatus as claimed in claim 1 wherein the control circuitry is configured such that a plurality of classes of data flow may be output or received within a frame time defined by the frame clock signal, each class of data flow being associated with a group of time slots, each group of time slots comprising one or more time slots.

5. A data interface apparatus as claimed in claim 4 wherein the control circuitry is configured so as to apply different handling to data associated with each class of data flow.

6. A data interface apparatus as claimed in claim 4 wherein a configurable maximum number of contiguous time slots is associated with each said group of time slots associated with a class of data flow.

7. A data interface apparatus as claimed in claim 4 wherein the control circuitry is configured to control the order in which said groups of time slots associated with classes of data flow appear in a frame.

8. A data interface apparatus as claimed in claim 4 wherein at least one class of data flow comprises an application data flow of application data.

9. A data interface apparatus as claimed in claim 8 wherein a configurable number of time slots may be associated with one or more application data channels.

10. A data interface apparatus as claimed in claim 8 wherein at least one said application data channel comprises an audio data channel or a haptic data channel.

11. A data interface apparatus as claimed in claim 4 wherein at least one class of data flow comprises a control data flow of control data and wherein a configurable number of time slots may be associated with at least one control channel for transmitting or receiving control data.

12. A data interface apparatus as claimed in claim 11 wherein said at least one control channel is associated with an intermittent low bandwidth data flow.

13. A data interface apparatus as claimed in claim 11 wherein said at least one control channel comprises a channel for control data for configuring the interface or for control data for operational configuration of circuitry coupled to the interface.

14. A data interface apparatus as claimed in claim 11 wherein said at least one control channel comprises a channel for data indicating a selected haptic waveform.

15. A data interface apparatus as claimed in claim 4 wherein at least one class of data flow comprises an program data flow of program data wherein a configurable number of time slots may be associated with at least one programming channel for outputting or receiving programming data.

16. A data interface apparatus as claimed in claim 4 wherein at least one class of data flow comprises a haptic data flow of haptic data.

17. A data interface apparatus as claimed in claim 4 wherein the control circuitry is configured such that a configurable number of time slots are associated with application data, a configurable number of time slots are associated with control data and a configurable number of time slots are associated with program data wherein any time slots associated with control data occur after any time slots associated with application data and where any time slots associated with program data occur after any time slots associated with control data.

18. A data interface apparatus as claimed in claim 4 wherein the control circuitry is configured such that the frequency of the frame clock signal can be changed at any time.

19. An integrated circuit comprising at least one data interface apparatus as claimed in claim 4.

20. An electronic device comprising a first and second integrated circuits, wherein a first data interface of the first integrated circuit is connected to a second data interface of the second integrated circuit and wherein at least one of the first and second data interfaces comprises a data interface apparatus as claimed in claim 4.

21. As electronic device as claimed in claim 20 wherein said electronic device is at least one of: a battery powered device, a portable device, a personal audio device, a personal video device; a mobile telephone, a personal data assistant, a gaming device, a portable computing device, a laptop and a satellite navigation system.

22. A method of data transfer comprising:
receiving a bit clock signal;
receiving a frame clock signal;
transmitting or receiving a data signal wherein said data is transmitted or received in one or more time slots of a predetermined number of bits;
wherein the bit clock signal frequency is varied at any time when transmitting or receiving said data signal and independently of the frame clock so as to vary the number of time slots in a frame; and
wherein predetermined time slots are associated with predetermined data channels and a data channel is accessed only if the frame contains an associated time slot.

23. A method of data transfer comprising:
defining a frame period via a frame clock signal;
defining a frame format comprising a first plurality of time slots, wherein each time slot is of a predetermined number of bits and is associated with a specified data channel; and
controlling a bit clock rate to vary its frequency at any time during data transfer so as to include a selected number of time slots in the frame period, wherein the selected number of time slots may be fewer than the number of said first plurality of time slots; and
wherein predetermined time slots are associated with predetermined data channels and a data channel is accessed only if a frame contains an associated time slot.

24. A data interface apparatus having control circuitry responsive to a bit clock signal and a frame clock signal to transfer data wherein the control circuitry is configured to vary the frequency of the bit clock signal when transferring data, independently of the frame clock signal, wherein the control circuitry is configured such that a plurality of classes of data flow may be output or received within a frame time defined by the frame clock signal, each class of data flow being associated with a group of time slots, each group of time slots comprising one or more time slots.

25. A method of data transfer comprising:
accessing a frame format mapping defining a plurality of time slots, wherein each time slot comprises a defined number of bits and is associated with a specified data channel; and
transferring data, at a bit rate defined by a bit clock signal, in said time slots in order from the beginning of a frame period to the end of a frame period;
wherein the frequency of the bit clock signal is changed when transferring data to alter the number of time slots in a frame.

* * * * *